F. ZBIKOWSKI.
AUTOMOBILE SIGNALING DEVICE.
APPLICATION FILED SEPT. 19, 1917.

1,297,961.

Patented Mar. 18, 1919.

Inventor
F. Zbikowski

By N. W. Wilson
Attorney

UNITED STATES PATENT OFFICE.

FRANK ZBIKOWSKI, OF BESSEMER, PENNSYLVANIA.

AUTOMOBILE SIGNALING DEVICE.

1,297,961.   Specification of Letters Patent.   Patented Mar. 18, 1919.

Application filed September 19, 1917.   Serial No. 192,093.

*To all whom it may concern:*

Be it known that I, FRANK ZBIKOWSKI, a citizen of Russia, residing at Bessemer, in the county of Lawrence and State of Pennsylvania, have invented certain new and useful Improvements in Automobile Signaling Devices, of which the following is a specification.

This invention relates to certain new and useful improvements in automobile signaling devices.

The primary object of the invention is a ready means carried by an automobile whereby the driver thereof may indicate the intended course of travel, the device having automatically operable illuminating mechanism.

A further object of the device is the provision of an indicating member carried at a convenient point upon a vehicle and readily operable from the driver's seat for presenting a pointer readily observed by the public for advising intended course of the vehicle.

A still further object of the device is the provision of a simple and inexpensive means for preventing accidents and whereby the driver of a vehicle may advise persons upon any side thereof in what direction he will steer the vehicle, the device being operable either during the day or at night time.

Figure 1:
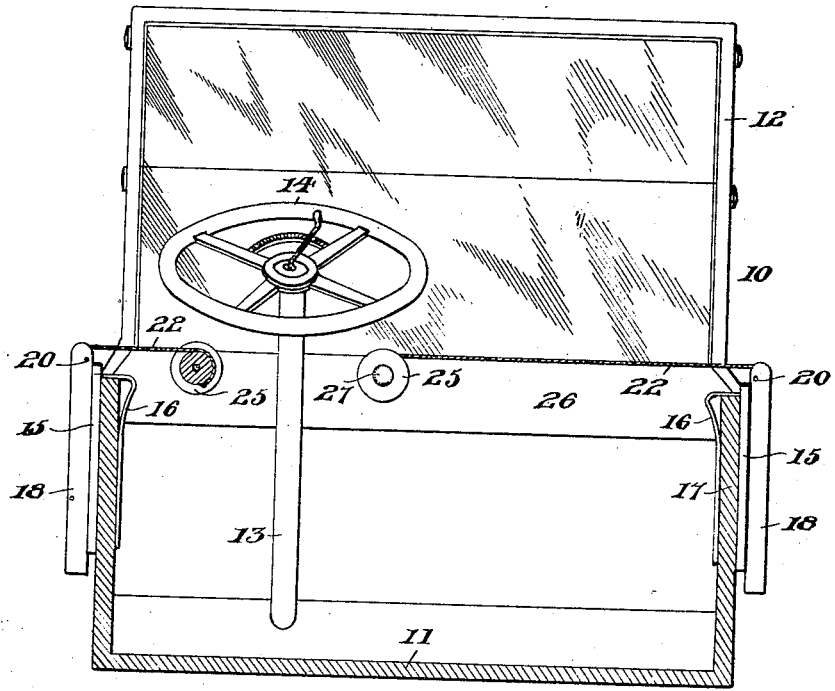
Figure 2:
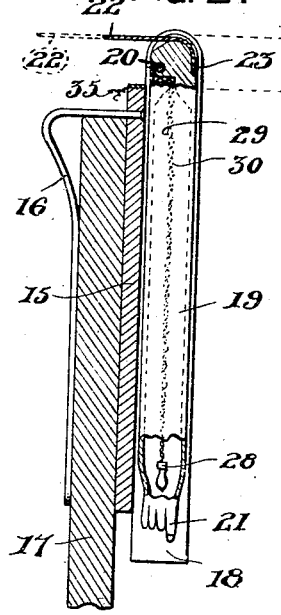
Figure 3:
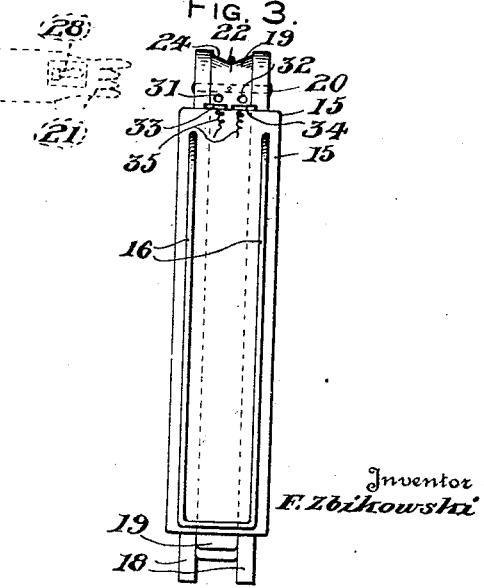

In the drawings forming a part of this application and in which like designating characters refer to corresponding parts throughout the several views, Figure 1 is a transverse sectional view through a vehicle provided with the present device, arranged adjacent the wind shield and steering wheel thereof, Fig. 2 is an enlarged view of the device mounted upon the vehicle and partially broken away and indicated by dotted lines in its operative arrangement and Fig. 3 is a rear elevation of the device.

Referring more in detail to the drawing the device is illustrated in connection with an automobile 10 having a body 11, wind shield 12, steering post 13 and wheel 14, it being understood that the driver's seat, not shown, is arranged rearwardly thereof.

A base board 15 is provided having a loop form of spring 16 mounted thereon adapted for overlying either of the sides 17 of the vehicle body for mounting the device at opposite sides of the vehicle upon the sides thereof.

A housing is carried by the board 15 consisting of opposite side plates 18 while a mechanical arm 19 is arranged between the plates 18, pivoted thereto by a bolt 20 which projects through the arm at a point rearwardly of its center.

These devices being preferably positioned at opposite points upon the vehicle are arranged for readily swinging the arms 19 upwardly and outwardly at either side of the vehicle that is, found desirable for indicating the intended course of travel for the vehicle. A hand 21 is arranged at the free end of each arm 19 while each of the said arms has an operating cord 22 secured thereto as at 23 and arranged within a groove 24 at the pivoted end thereof, the said cord passing over and secured to drums 25 arranged upon the dashboard 26 of the vehicle. The arrangement is such that upon turning the knob 27 of one of the drums 25, the cord 22 will be wound thereon and exerting a pull upon the adjacent arm 19 and moving the arm with its hand 21 to an outstretched substantially horizontal position as indicated by dotted lines in Fig. 2.

The drum 25 is adapted to remain in its shifted position until again manipulated by the driver for releasing the cord 22 and permitting the arm 19 to move downwardly of its own weight.

An electric lamp 28 is arranged within the arm 19 having circuit wires 29 and 30 arranged with terminals 31 and 32 respectively. Contact plates 33 and 34 are positioned upon the upper end of the board 15 adapted for engagement by the terminals 31 and 32 respectively when the arm 19 is outstretched. Circuit wires 35 are provided for the contact plates 33 and 34 leading to a suitable source of electrical supply, such as the storage battery of the vehicle and whereby as will be evident, the electrical circuit for the lamp 28 will be completed when the arm 19 carrying the said lamp is outstretched, so that the hand 21 will be automatically illuminated whenever the indicating arm 19 is in its operative position and enabling the device to be readily seen at night. The arm 19 is partially tubular in form while the hand 21 is preferably formed of colored glass or partially transparent material.

It will be seen that an inexpensive direction indicator for vehicles is provided in which the driver may readily elevate either of the arms 15 upon turning one of the knobs 27 and may readily permit the same to automatically return to its inoperative position when desired, and the device may be readily removed from the vehicle for changing its position thereon when desired.

What I claim as new is:—

1. A direction indicator comprising a board, an attaching spring upon the back of said board, opposite spaced parallel plates carried by the front of said board, an upwardly swingable indicating arm normally vertically arranged downwardly between said plates and having its upper end pivotally attached to said plates adjacent the upper ends thereof, a groove in the upper end of the arm, a frictionally maintained adjusting drum, and a cord attached at one end to said drum and having its other end positioned within said groove and attached to the outer side of the upper end of the arm.

2. A direction indicator comprising a board, an attaching spring upon the back of said board arranged to clamp the board flatly against the side of a vehicle body, opposite spaced parallel plates carried by the front of said board, an upwardly swingable indicating arm normally vertically arranged downwardly between said plates and having its upper end pivotally attached to said plates adjacent the upper ends thereof, and means to upwardly swing said indicating arm.

3. A direction indicator comprising a board, an attaching spring upon the back of said board arranged to clamp the board flatly against the side of a vehicle body, opposite spaced parallel plates carried by the front of said board, an upwardly swingable indicating arm normally vertically arranged downwardly between said plates and having its upper end pivotally attached to said plates adjacent the upper ends thereof, an adjusting drum, and a cord attached at one end to said drum and having its other end attached to the outer side of the upper end of the arm.

In testimony whereof I affix my signature.

FRANK ZBIKOWSKI.